(12) United States Patent
Mathews et al.

(10) Patent No.: US 6,223,263 B1
(45) Date of Patent: Apr. 24, 2001

(54) METHOD AND APPARATUS FOR LOCKING AND UNLOCKING A MEMORY REGION

(75) Inventors: Gregory Scott Mathews, Santa Clara; Selina Sze Wan Yuen, Fremont, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/150,518

(22) Filed: Sep. 9, 1998

(51) Int. Cl.[7] .............................. G06F 12/00; G06F 12/14
(52) U.S. Cl. ..................... 711/163; 711/150; 711/152; 711/164; 711/165; 711/206; 711/207
(58) Field of Search ................................ 711/150, 152, 711/156, 154, 163, 164, 165, 200–209

(56) References Cited

U.S. PATENT DOCUMENTS

| 5,175,837 | * | 12/1992 | Arnold et al. | 711/152 |
| 5,285,528 | * | 2/1994 | Hart | 710/200 |
| 5,341,491 | * | 8/1994 | Ramanujan | 711/152 |
| 5,983,329 | * | 11/1999 | Thaler et al. | 711/163 |

* cited by examiner

Primary Examiner—Than Nguyen
(74) Attorney, Agent, or Firm—David J. Kaplan

(57) ABSTRACT

A method and apparatus for managing a memory region that stores locked and unlocked data. Data stored in the memory region is accessed. The data has an associated index that is stored in a locked index queue. While the index is stored in the locked index queue, the data is locked.

8 Claims, 3 Drawing Sheets

Figure 1a

LIQ: 1, 3, 5, 7

| Index | NRU | Data |
|---|---|---|
| 0 | 1 | A |
| 1 | 0 | B |
| 2 | 1 | C |
| 3 | 0 | D |
| 4 | 1 | E |
| 5 | 0 | F |
| 6 | 1 | G |
| 7 | 0 | H |

Figure 1b

LIQ: 3, 1, 5, 7

| Index | NRU | Data |
|---|---|---|
| 0 | 1 | A |
| 1 | 0 | B |
| 2 | 1 | C |
| 3 | 0 | D |
| 4 | 0 | E |
| 5 | 0 | F |
| 6 | 1 | G |
| 7 | 0 | H |

Figure 1c

LIQ: 0, 3, 1, 5

| Index | NRU | Data |
|---|---|---|
| 0 | 0 | X |
| 1 | 0 | B |
| 2 | 1 | C |
| 3 | 0 | D |
| 4 | 0 | E |
| 5 | 0 | F |
| 6 | 1 | G |
| 7 | 0 | H |

Figure 1d

LIQ: 6, 0, 3, 1

| Index | NRU | Data |
|---|---|---|
| 0 | 0 | X |
| 1 | 0 | B |
| 2 | 1 | C |
| 3 | 0 | D |
| 4 | 0 | E |
| 5 | 0 | F |
| 6 | 0 | G |
| 7 | 0 | H |

Figure 1e

LIQ: 1, 6, 0, 3

| Index | NRU | Data |
|---|---|---|
| 0 | 0 | X |
| 1 | 0 | B |
| 2 | 0 | C |
| 3 | 0 | D |
| 4 | 0 | E |
| 5 | 0 | F |
| 6 | 0 | G |
| 7 | 0 | H |

Figure 1f

LIQ: 1, 6, 0, 3

| Index | NRU | Data |
|---|---|---|
| 0 | 0 | X |
| 1 | 0 | B |
| 2 | 1 | C |
| 3 | 0 | D |
| 4 | 1 | E |
| 5 | 1 | F |
| 6 | 0 | G |
| 7 | 1 | H |

Figure 1g

LIQ: 2, 1, 6, 0

| Index | NRU | Data |
|---|---|---|
| 0 | 0 | X |
| 1 | 0 | B |
| 2 | 0 | Y |
| 3 | 0 | D |
| 4 | 1 | E |
| 5 | 1 | F |
| 6 | 0 | G |
| 7 | 1 | H |

Figure 1h

LIQ: 2, 1, 6, 0

| Index | NRU | Data |
|---|---|---|
| 0 | 0 | X |
| 1 | 0 | B |
| 2 | 0 | Y |
| 3 | 0 | D |
| 4 | 1 | E |
| 5 | 1 | F |
| 6 | 0 | G |
| 7 | 0 | H |

METHOD AND APPARATUS FOR LOCKING AND UNLOCKING A MEMORY REGION

The present invention relates to computer systems and more particularly to a replacement algorithm for data stored in a memory region in which the data is locked or unlocked.

BACKGROUND

Computer systems, from small handheld electronic devices to medium-sized mobile and desktop systems to large servers and workstations, are becoming increasingly pervasive in our society. Computer systems typically include one or more processors. A processor manipulates and controls the flow of data in a computer. Increasing the speed of the processor tends to increase the computational power of the computer, and processor designers employ many different techniques to increase processor speed to create more powerful computers for consumers. One such technique is to provide circuitry that supports tickle instructions.

A tickle instruction is placed in a sequence of instructions prior to a data access instruction. The tickle instruction checks processor resources to determine if the data access instruction will cause a fault (or exception) to occur, and if so, to eliminate the fault. The tickle instruction eliminates a fault by causing the fault to occur early, forcing the processor to launch the appropriate exception handler to remedy the fault. While the fault is being remedied, the processor may execute other instructions in the instruction sequence. Ideally, by the time the processor executes the data access instruction, th e fault has been eliminated, so the processor does not need to stall the execution of subsequent instructions while remedying the fault. Thus processor speed is improved.

For example, one type of tickle instruction is a faulting probe instruction. A faulting probe instruction is inserted into an instruction sequence before an associated load or store instruction. Upon executing the faulting probe instruction, the processor performs a fault check lookup of the data needed to perform a faultless execution of the subsequent load or store instruction. For example, the processor verifies that the proper address translation data is stored in the translation buffer and that the processor has the necessary privileges to access the data. If no faults are detected, execution of the instruction sequence proceeds normally. If a fault is detected, the appropriate exception handler is launched to either load the needed translation data into the translation buffer or to get privileges to access the data. The load or store instruction may then be executed without causing a fault or exception.

Note that there are other tickle instructions that perform similar functions, such as faulting prefetch instructions.

Unfortunately, there are problems associated with this usage of tickle instructions. Instructions executed between the tickle instruction and its associated data access instruction may modify the state of the processor. In some cases, this modification may result in a fault upon execution of the data access instruction, notwithstanding the fact that the associated tickle instruction was previously executed. For example, in the scenario presented above, suppose new data is loaded into the translation buffer after the faulting probe instruction is executed but before the load or store instruction is executed. Depending on the size of the translation buffer and the replacement algorithm used, the new data may replace the data needed by the load or store instruction. If so, a fault occurs upon executing the load or store instruction.

At best, this fault may result in a delay while the processor re-loads the necessary data into the translation buffer, thereby reducing processor speed. In some cases, however, the fault may result in an error, thereby halting program execution or corrupting data integrity.

SUMMARY OF THE INVENTION

A method and apparatus is described for managing a memory region that stores locked and unlocked data. When data stored in the memory region is accessed, the associated index of that data is stored in a locked index queue. While the index is stored in the locked index queue, the data is locked.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which:

FIGS. 1a–h show a memory region and locked index queue at different points in time in accordance with an embodiment of the present invention;

DETAILED DESCRIPTION

Figure 2:
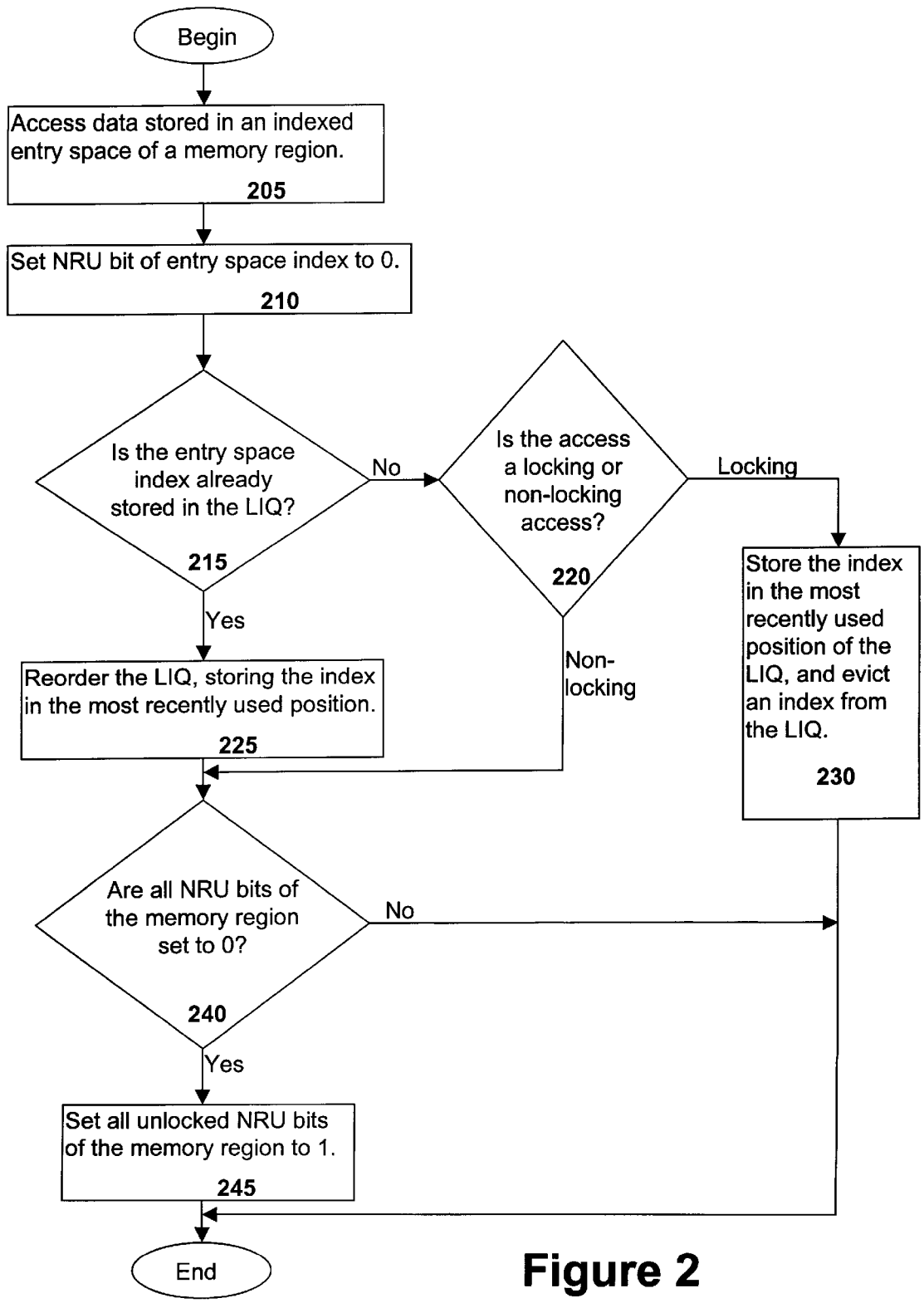
FIG. 2 is a flow chart showing a method of the present invention.

In accordance with an embodiment of the present invention, data is stored in entry spaces of a fully associative memory region. An entry space, along with the data stored therein, may be either locked or unlocked. The memory region implements a single bit, not recently used (NRU), replacement algorithm. When unlocked data is accessed by a non-locking instruction (called a non-locking access), the data remains unlocked, and a replacement bit associated with the data is set to "0". When unlocked data is accessed by a locking instruction (called a locking access), the data is locked, and a replacement bit associated with the data is set to "0".

A locked index queue (LIQ) is associated with the memory region. Data is locked by temporarily storing its associated index in the LIQ. The LIQ implements a multiple bit, least recently used (LRU), replacement algorithm. The LIQ has fewer entry spaces than its associated memory region, so not all indices of the memory region can be stored in the LIQ simultaneously. When unlocked data becomes locked, the index associated with the data is stored in the most recently used position of the LIQ, and the index previously stored in the least recently used position of the LIQ is evicted. Upon eviction from the LIQ, the data associated with the evicted index becomes unlocked. Upon a locking or non-locking access of locked data, the LIQ is reordered by placing the index associated with the accessed data in the most recently used position of the LIQ, moving the previous most recently used data in the LIQ to the second most recently used position, moving the previous second most recently used data in the LIQ to the third most recently used position, etc. For an alternate embodiment of the present invention, the LIQ may be reordered only by a locking access.

Once all the replacement bits of the memory region are "0", the replacement bits are reset by setting all replacement bits to "1" except those replacement bits having associated indices stored in the LIQ. By inhibiting the replacement bits associated with indices stored in the LIQ from being set to "1", replacement of the data associated with those replacement bits is similarly inhibited. Thus, data is locked (i.e. replacement of the data is inhibited) as long as its associated index is stored in the LIQ. For alternate embodiments of the present invention, locked data may be invalidated or replaced by special instructions such as purge instructions.

In accordance with the present invention, a fault check lookup, performed in conjunction with the execution of a tickle instruction, is defined to be a type of locking access. Because a fault check lookup is a locking access, a fault check lookup of data in a translation buffer temporarily locks the data in the buffer by storing the index associated with the data in an LIQ. This ensures that the translation buffer data will not be readily replaced by subsequent instructions, thereby reducing the likelihood that a subsequently executed load instruction will encounter a fault.

A more detailed description of embodiments of the present invention, including various configurations and implementations, is provided below. As used herein, the described associations between an entry space of a memory region, the index of the entry space, the data stored in the entry space, and the replacement and lock bits of the entry space are transitive. For example, the phrase "the index associated with the data" is intended to indicate the index of the entry space in which the data is stored. Conversely, the phrase "the data associated with the index" is intended to indicate the data stored in the entry space having that index. Similarly, the phrase "the index and data associated with the replacement bit" is intended to indicate the index of an entry space and the data stored in the entry space having the associated replacement bit. In addition, locking an entry space locks the data stored in the entry space, and unlocking an entry space unlocks the data stored in the entry space.

FIGS. 1a–h show a memory region 102 and its associated LIQ 101 at different points in time in accordance with an embodiment of the present invention. In accordance with one embodiment of the present invention, memory region 102 is fully associative. For an alternate embodiment, the memory region is a set of a set associative memory array, or a portion thereof. Although memory region 102 includes eight entry spaces, a memory region used in accordance with the present invention may include from two up to any number of entry spaces. In addition, memory region 102 may be one of any number of memory regions of a memory array, each memory region having its own associated LIQ. Alternatively, multiple memory regions may share a single LIQ. For an embodiment in which memory region 102 is a translation buffer (or a portion thereof), the data stored in memory region 102 may be address translation data, page attribute data, or page permission data. Alternatively, the memory region may be a data or instruction cache located inside or outside a processor.

Each of the eight entry spaces of memory region 102 of FIGS. 1a–h is indexed by an index number. Each entry space includes storage space for data as well as storage space for an NRU replacement bit. Alternatively, the replacement bit may be stored in a separate memory location. In accordance with FIGS. 1a–h, memory region 102 implements an NRU replacement algorithm in which a value of "1" indicates that the associated data has not been recently used and a value of "0" indicates that the associated data has been recently used. For an alternate embodiment, negative logic is implemented for the replacement bits in an NRU replacement algorithm. For another embodiment, an alternate single or multiple bit replacement algorithm is implemented.

As shown in FIGS. 1a–h, memory region 102 has an associated LIQ 101 containing entry spaces in which indices of memory region 102 are temporarily stored. LIQ 101 includes only four entry spaces, half that of memory region 102. Thus, up to half the number of indices of memory region 102 may be stored in LIQ 101 at any given time. This ensures that up to half the data stored in memory region 102 may be available for replacement (described in more detail below) at any given time. In accordance with an alternate embodiment of the present invention, an LIQ associated with a particular memory region may include any number of entry spaces that is less than the total number of indexed entry spaces of its associated memory region.

In accordance with FIGS. 1a–h, LIQ 101 implements an LRU replacement algorithm. For an alternate embodiment of the present invention, a most recently used (MRU) replacement algorithm is implemented. As illustrated, the most recently used position of LIQ 101 is the upper entry space containing an index of "1" in FIG. 1a. The second most recently used position of LIQ 101 contains an index of "3", and the third most recently used position contains an index of "5" in FIG. 1a. The least recently used position of LIQ 101 is the lower entry space containing an index of "7" and is the LIQ entry which has least recently been used. For another embodiment of the present invention, an alternate multiple bit replacement algorithm is implemented.

As shown in FIG. 1a, data A, C, E, and G stored in memory region 102 have associated NRU bits of "1" indicating that this data has not been recently used. Therefore, data A, C, E, and G are available for replacement upon a write-allocate to memory region 102. Data B, D, F, and H stored in memory region 102 have associated NRU bits of "0" indicating that this data has been recently used. Therefore, data B, D, F, and H are not available for replacement. In addition, the indices associated with data B, D, F, and H are stored in LIQ 101, thereby locking this data.

FIG. 1b shows the LIQ 101 and memory region 102 of FIG. 1a after data D and E are read. In accordance with an embodiment of the present invention, reading data from memory region 102 is a non-locking access. A non-locking access is an access that does not cause the accessed data to be locked. The NRU bit associated with data D is already set to "0", as shown in FIG. 1a, indicating that the data has been recently used (or accessed). This replacement bit value is maintained in FIG. 1b. Also, as shown in FIG. 1a, data D is locked, and the index associated with data D, "3", is stored in the second most recently used position of LIQ 101. As shown in FIG. 1b, the LIQ is reordered upon accessing data D, placing index "3" in the most recently used position of LIQ 101 and moving the previous most recently used index, "1", into the second most recently used position. For an alternate embodiment of the present invention, a non-locking access of locked data does not cause a reordering of the LIQ, but rather, only a locking access causes a reordering of the LIQ.

The NRU bit associated with data E is "1" in FIG. 1a, indicating that the data has not recently been used. This replacement bit is set to "0" upon reading data E, as shown in FIG. 1b, indicating that the data has been recently used. Because the reading of data E is a non-locking access, the index associated with data E, "4", is not stored in the LIQ.

At this point, only data A, C, and G are available for replacement upon a write to memory region 102, as indicated by the NRU bits in FIG. 1b. The indices associated with data D, B, F, and H are stored in LIQ 101, thereby locking this data.

FIG. 1c shows the LIQ 101 and memory region 102 of FIG. 1b after data X is written into the entry space of index "0", thereby replacing data A with data X. In accordance with an embodiment of the present invention, writing data to memory region 102, which may be implemented by a store instruction, is a locking access. A locking access is an access that causes the accessed data to be locked. Writing data to memory region 102 may be done as a result of executing a tickle instruction that causes a fault, and launching the appropriate exception handler that writes the data to the memory region. For one embodiment of the present invention, one or more types of load or store instructions may be classified as locking instructions. The NRU bit associated with data A is "1" in FIG. 1b, indicating that the data has not recently been used. This replacement bit is set to "0" upon replacing data A with data X, as shown in FIG. 1c, indicating that data X has been recently used.

As shown in FIG. 1c, index "0" associated with data X is entered into the most recently used position of LIQ 101. The previous most recently used index, "3", drops to the second most recently used position of LIQ 101. The previous second most recently used index, "1", drops to the third most recently used position of the LIQ. The previous third most recently used index, "5", drops to the least recently used position. Due to overflow of LIQ 101, the previous least recently used index, "7", is evicted from the LIQ. Upon eviction, the data associated with index "7", data H, is unlocked. For one embodiment of the present invention, in addition to unlocking the data associated with index "7" upon eviction, the NRU bit associated with index "7" is set to "1".

At this point, only data C and G are available for replacement upon a write to memory region 102, as indicated by the NRU bits in FIG. 1c. The indices associated with data X, D, B, and F are stored in LIQ 101, thereby locking this data.

FIG. 1d shows the LIQ 101 and memory region 102 of FIG. 1c after performing a fault check lookup of data G and reading data H. The fault check lookup of data G is performed in response to the execution of a tickle instruction. In accordance with an embodiment of the present invention, an access of memory region 102, such as a fault check lookup, that is the result of a tickle instruction, is a locking access. Upon accessing data G, its associated NRU bit is set to "0".

As shown in FIG. 1d, the index associated with data G is "6". This index is entered into the most recently used position of LIQ 101. The previous most recently used index, "0", drops to the second most recently used position of LIQ 101. The previous second most recently used index, "3", drops to the third most recently used position of the LIQ, and the previous third most recently used index, "1", drops to the least recently used position. Due to overflow of LIQ 101, the previous least recently used index, "5", is evicted from the LIQ. Upon eviction, the data associated with index "5", data F, is unlocked.

Upon reading data H, the associated NRU bit remains "0" in FIG. 1d. Because the reading of data H is a non-locking access, the index associated with data H, "7", is not stored in the LIQ.

At this point, only data C is available for replacement, as indicated by the NRU bits in FIG. 1d. The indices associated with data G, X, D, and B are stored in LIQ 101, thereby locking this data.

FIG. 1e shows the LIQ 101 and memory region 102 of FIG. 1d after data B, C, and F are read. As shown in FIG. 1d, the NRU bits associated with data B and F are already "0". This replacement bit value is maintained in FIG. 1e. Also, as shown in FIG. 1d, data B is locked, and the index associated with data B, "1", is stored in the least recently used position of LIQ 101. As shown in FIG. 1e, the LIQ is reordered upon accessing data B such that the index is placed in the most recently used position of LIQ 101. Upon reading data C, the associated NRU bit is set to "0".

At this point, none of the data is available for replacement, as indicated by the fact that all the NRU bits of the memory region of FIG. 1e are "0". As a result, the NRU bits of memory region 102 are reset as shown in FIG. 1f. The NRU bits are reset by setting all NRU bits associated with unlocked data to "1". In other words, the NRU bits associated with indices that are not stored in LIQ 101 are set to "1", and all other NRU bits (those associated with indices that are stored in the LIQ) remain "0".

In accordance with one embodiment of the present invention, each entry space of the memory region includes storage space for a lock bit in addition to at least one replacement bit (such as an NRU bit) and data. This lock bit is set to a locked status when its associated index is stored in the LIQ, and is otherwise set to an unlocked status when its index is not stored in the LIQ. This embodiment may be found useful during reset of the NRU bits of the memory region. For example, for an embodiment in which locked data is indicated by an associated lock bit of "0", and unlocked data is indicated by an associated lock bit of "1", upon reset of the memory region, each lock bit is simply copied over to its associated NRU bit. The use of lock bits in this manner may result in faster resetting of the NRU bits in a memory region than an embodiment in which the LIQ must be searched to determine which entry spaces are locked each time the NRU bits are reset.

At this point, data C, E, F, and H become available for replacement, as indicated by the NRU bits in FIG. 1f. The indices associated with data B, G, X, and D are stored in LIQ 101, thereby locking this data.

FIG. 1g shows the LIQ 101 and memory region 102 of FIG. 1f after data Y is written into the entry space of index "2", thereby replacing data C with data Y. The NRU bit associated with data Y is set to "0" upon writing the data into memory region 102. Index "2" is entered into the most recently used position of LIQ 101. The previous most recently used index, "1", drops to the second most recently used position of LIQ 101. The previous second most recently used index, "6", drops to the third most recently used position of the LIQ, and the previous third most recently used index, "0", drops to the least recently used position. Due to overflow of LIQ 101, the previous least recently used index, "3", is evicted from the LIQ. Upon eviction, the data associated with index "3", data D, is unlocked.

At this point, only data E, F, and H are available for replacement, as indicated by the NRU bits in FIG. 1g. The indices associated with data Y, B, G, and X are stored in LIQ 101, thereby locking this data.

FIG. 1h shows the LIQ 101 and memory region 102 of FIG. 1g after data H is read. Upon reading data H, the associated NRU bit is set to "0" in FIG. 1h. Because this is a non-locking access of data H, and the index associated with data H is not stored in LIQ 101, the order and contents of the LIQ are maintained.

At this point, only data E and F are available for replacement, as indicated by the NRU bits in FIG. 1h. The indices associated with data Y, B, G, and X are stored in LIQ 101, thereby locking this data. Manipulation of data and management of LIQ 101 and memory region 102 continue in the above-described manner as necessary to support the execution of a computer program.

FIG. 2 is a flow chart showing a method of the present invention. Initially, at step 205, data stored in an indexed entry space of a memory region is accessed as a result of executing a locking instruction, such as a store, write, or tickle instruction, or a non-locking instruction, such as a read. Upon being accessed, the NRU bit associated with the accessed data is set to "0" at step 210, indicating that the data has been recently used. At step 215 it is determined whether or not the index associated with the data is already stored in the LIQ associated with the memory region.

If the index is already stored in the LIQ, the LIQ is reordered at step 225, placing the index associated with the accessed data in the most recently used position of the LIQ, and the method proceeds to step 240. If, instead, the index is not already stored in the LIQ, it is then determined at step 220 if the access is a locking or a non-locking access. If the access is a locking access, the data is locked at step 230 by storing the index in the most recently used position of the LIQ. Also, at step 230, the overflow of the LIQ caused by the storing of the index in the most recently used position of the LIQ causes the index stored in the least recently used position to be evicted from the LIQ. The data associated with the evicted index is now unlocked.

If, instead, it is determined at step 220 that the access is a non-locking access, the contents and order of the LIQ are maintained and the method proceeds to step 240. At step 240 it is determined if all the NRU bits of the memory region are set to "0", indicating that all the data in the memory region has been recently used. If so, the NRU bits of the memory region are reset by setting all unlocked bits (that is, NRU bits associated with unlocked data) of the memory region to "1". If not, the NRU bit values are maintained.

Figure 3:
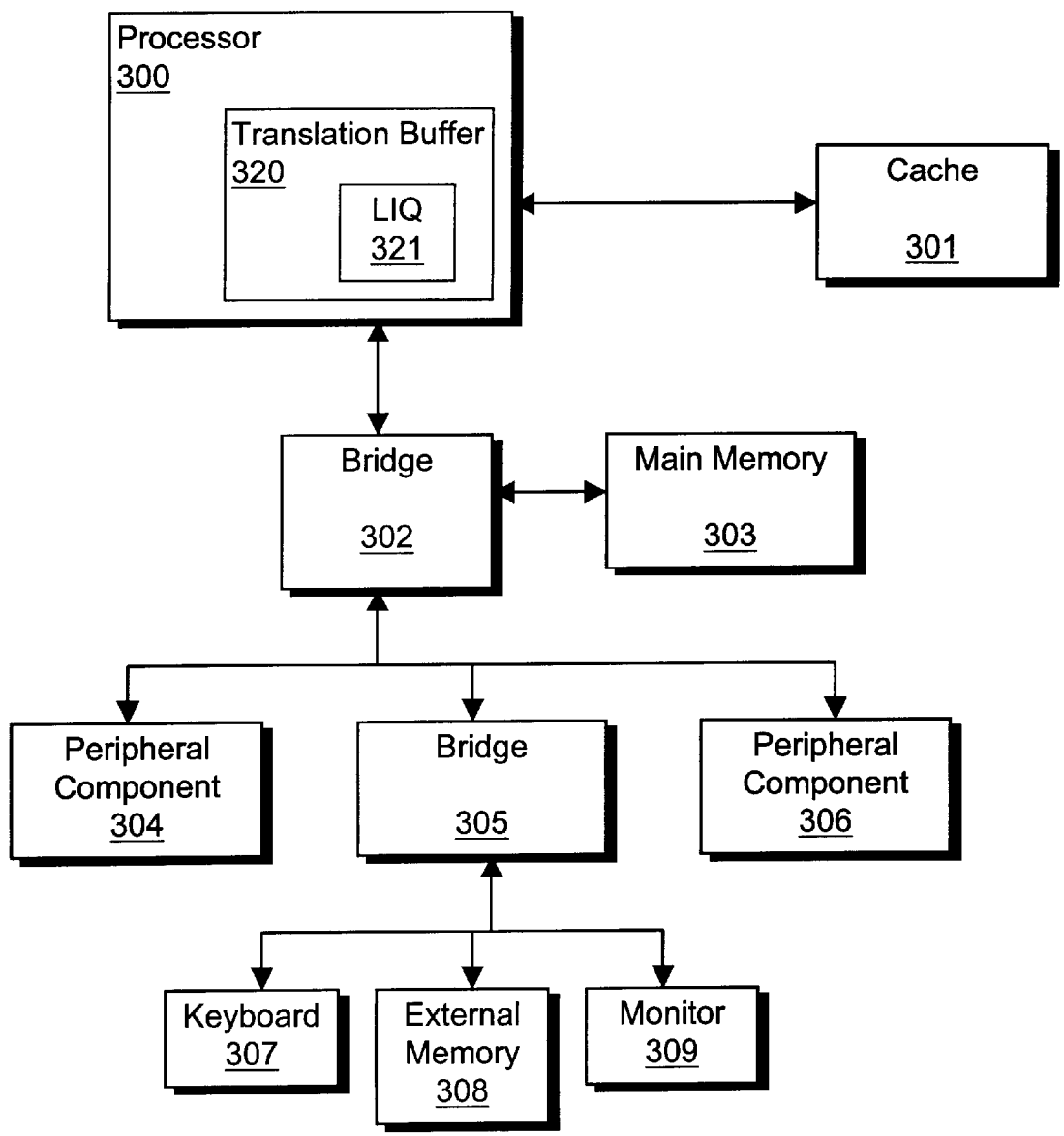
FIG. 3 is a computer system in accordance with an embodiment of the present invention.

FIG. 3 is a computer system formed in accordance with an embodiment of the present invention. Processor 300 includes translation buffer 320. Translation buffer 320 includes a fully associative memory region having an associated LIQ 321. Cache 301 and bridge 302 are coupled to processor 300. Bridge 302 is used to couple processor 300 to main memory 303 and to peripheral components 304 and 306. Bridge 305 couples keyboard 307, external memory 308, and monitor 309 to bridge 302.

Peripheral components 304 and 306 may include audio and video generators, accelerators, or analyzers. External memory 308 of FIG. 3 may include a hard drive, floppy disk, tape drive, other magnetic storage media, a battery powered random access memory (RAM) device, an electrically programmable read only memory (EPROM) storage device, other solid-state storage device, a CD-ROM, or other non-volatile, machine-readable, storage mediums. For one embodiment of the present invention, external memory 308 is removable and portable.

A sequence of instructions are stored in external memory 308 of FIG. 3, including a locking instruction. When the computer system of FIG. 3 is activated, processor 300 transfers the locking instruction from external memory 308 into main memory 303 via bridges 305 and 302. This locking instruction may then be transferred cache 301 before being executed by processor 300. Upon execution, the locking instruction causes processor 300 to access data stored in translation buffer 320 and to lock the data by storing the index associated with the data into LIQ 321. In managing translation buffer 320, the steps described above in conjunction with FIG. 2 are implemented.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A method of managing a memory region comprising:
   accessing data stored in an indexed entry space of the memory region;
   determining if an index of the entry space is already stored in a locked index queue (LIQ); and
   both storing the index of the entry space in the LIQ and evicting an index from the LIQ if it is determined that the index of the entry space is not already stored in the LIQ and the access is a locking access.

2. The method of claim 1, further comprising maintaining contents and order of the LIQ if it is determined that the index of the entry space is not already stored in the LIQ and the access is a non-locking access.

3. The method of claim 1, further comprising reordering the LIQ by placing the index of the entry space in a most recently used position of the LIQ if it is determined that the index of the entry space is already stored in the LIQ.

4. The method of claim 1, further comprising:
   setting a replacement bit associated with the entry space to a first value indicating that the data has been recently used; and
   setting the replacement bit to a second value indicating that the data has not been recently used if all replacement bits of the memory region are set to the first value and the index of the entry space is not stored in the LIQ.

5. The method of claim 1, further comprising:
   setting a replacement bit associated with the entry space to a first value indicating that the data has been recently used; and
   inhibiting the replacement bit from being set to a second value indicating that the data has not been recently used if all replacement bits of the memory region are set to the first value and the index of the entry space is stored in the LIQ.

6. The method of claim 1, further comprising setting a replacement bit associated with an evicted index to a value that indicates that data stored in an entry space associated with the evicted index has not been recently used.

7. A computer system comprising:
   a translation buffer to implement a not recently used (NRU) replacement algorithm;
   an entry space in the translation buffer having an associated index;
   a main memory to store a locking access instruction to access translation data to be stored in the entry space;
   a processor to execute the instruction and access the translation data; and
   a locked index queue (LIQ) to implement a most recently used (MRU) replacement algorithm, the LIQ to temporarily store the index upon accessing the translation data, the translation data to be locked while the index is stored in the LIQ and unlocked upon eviction from the LIQ.

8. The computer system of claim 7 wherein the instruction is a fault check lookup.

* * * * *